(12) United States Patent
Dopf et al.

(10) Patent No.: US 11,773,920 B2
(45) Date of Patent: Oct. 3, 2023

(54) METHOD FOR PRODUCING A FRICTION DISC ARRANGEMENT

(71) Applicant: Miba Frictec GmbH, Laakirchen (AT)

(72) Inventors: Andreas Dopf, Eberstalzell (AT); Helmut Mazanek, Pinsdorf (AT); Matthias Poelzgutter, Seewalchen am Attersee (AT); Laurenz Strassmaier, Gmunden (AT); Rainer Gneissl, Regau (AT)

(73) Assignee: MIBA FRICTEC GMBH, Laakirchen (AT)

( * ) Notice: Subject to any disclaimer, the term of this patent is extended or adjusted under 35 U.S.C. 154(b) by 0 days.

(21) Appl. No.: 17/725,612

(22) Filed: Apr. 21, 2022

(65) Prior Publication Data

US 2022/0356910 A1  Nov. 10, 2022

(30) Foreign Application Priority Data

May 10, 2021  (DE) .................... 10 2021 112 150.7

(51) Int. Cl.
*F16D 13/64*  (2006.01)
*F16D 21/06*  (2006.01)

(52) U.S. Cl.
CPC ............. *F16D 21/06* (2013.01); *F16D 13/64* (2013.01); *F16D 2250/0023* (2013.01); *F16D 2250/0053* (2013.01); *F16D 2250/0092* (2013.01)

(58) Field of Classification Search
CPC ....... F16D 2250/0023; F16D 13/64–69; F16D 21/06–2021/0692
See application file for complete search history.

(56) References Cited

U.S. PATENT DOCUMENTS

| 4,770,283 A * | 9/1988 | Putz .................. F16D 69/00 72/359 |
| 6,381,822 B1 * | 5/2002 | Watanabe ............ F16D 69/04 29/415 |
| 2019/0242439 A1 * | 8/2019 | Wagner .................. F16D 13/52 |

FOREIGN PATENT DOCUMENTS

| DE | 10 2014 223 033 A1 | 6/2015 |
| EP | 2 063 146 A1 | 5/2009 |

* cited by examiner

*Primary Examiner* — David R Morris
(74) *Attorney, Agent, or Firm* — Collard & Roe, P.C.

(57) ABSTRACT

A method for producing friction discs for a, in particular radial, dual clutch, includes the following steps: providing a first disc ring with a first inner diameter, providing a second disc ring with a second outer diameter, wherein the second outer diameter is smaller than the first inner diameter, and processing the first disc ring and the second disc ring in a tool for producing the friction discs. The second disc ring is arranged within the first disc ring, and the second and the first disc rings are processed in the tool together.

14 Claims, 3 Drawing Sheets

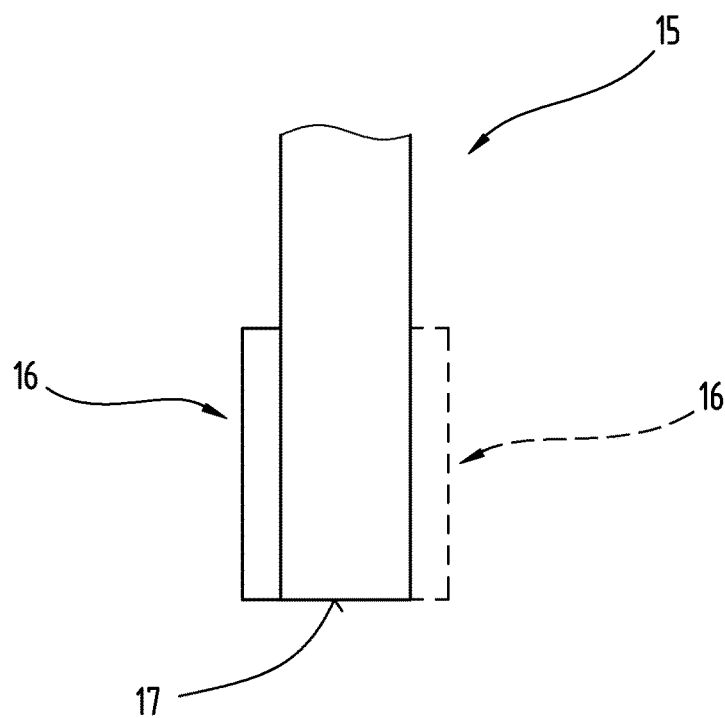
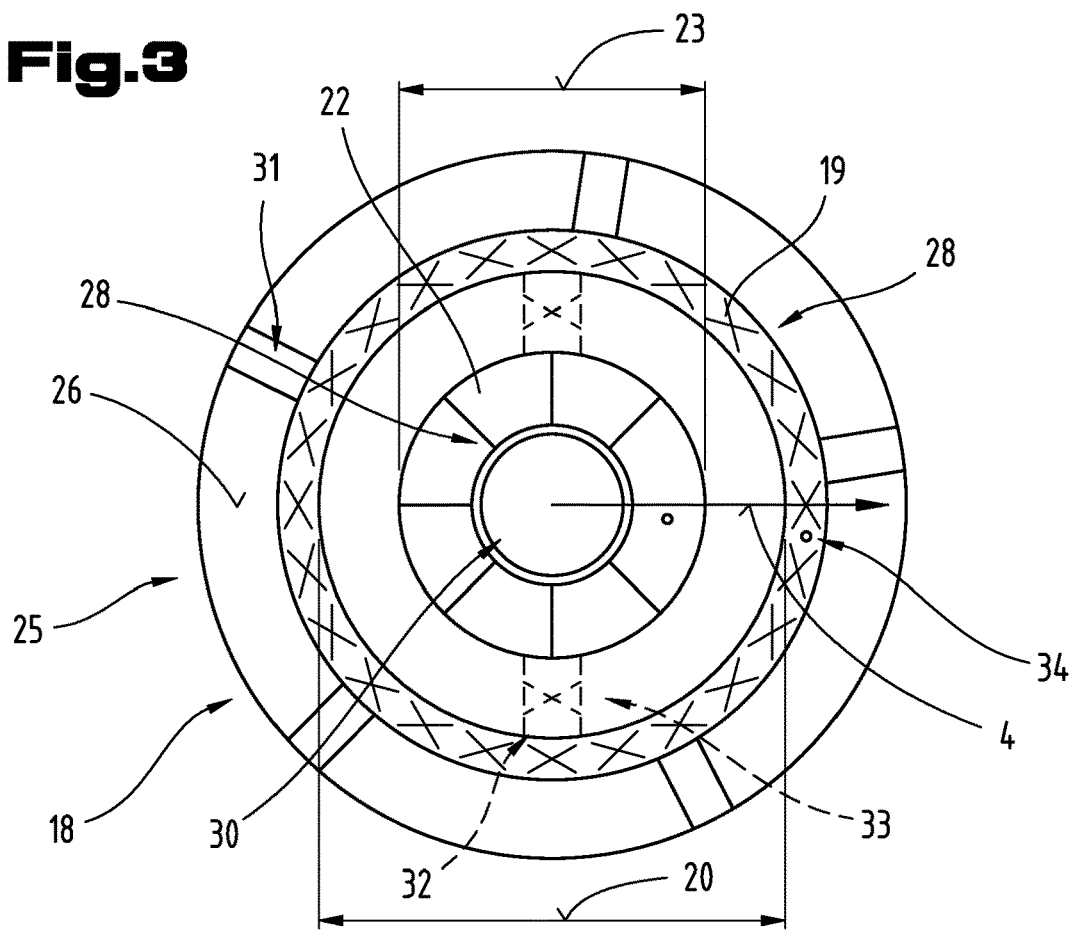

METHOD FOR PRODUCING A FRICTION DISC ARRANGEMENT

CROSS REFERENCE TO RELATED APPLICATIONS

Applicant claims priority under 35 U.S.C. § 119 of German Application No. 10 2021 112 150.7 filed May 10, 2021, the disclosure of which is incorporated by reference.

BACKGROUND OF THE INVENTION

1. Field of the Invention

The invention relates to a method for producing friction discs for a, in particular radial, dual clutch, comprising the following steps: providing a first disc ring with a first inner diameter; providing a second disc ring with a second outer diameter, wherein the second outer diameter is smaller than the first inner diameter; processing the first disc ring and the second disc ring in a tool for producing the friction discs.

The invention further relates to a friction disc arrangement comprising a first friction disc ring with a first inner diameter and a first axial ring thickness, a second friction disc ring with a second outer diameter and a second axial ring thickness, wherein the second outer diameter is smaller than the first inner diameter, and wherein the second friction disc ring can be arranged within the first friction disc ring.

Moreover, the invention relates to an, in particular radial, dual clutch comprising an outer disc pack and an inner disc pack.

2. Description of the Related Art

Radial dual clutches for a dual clutch transmission are known. For example, DE 10 2014 223 033 A1 is a wet-running radial dual clutch, comprising a radially outer first clutch and a radially inner second clutch, which are arranged being rotatable about a common axis of rotation. The dual clutch comprises an outer disc carrier with outer discs and an inner disc carrier with inner discs. The inner discs are arranged within the outer discs (as seen in the radial direction). Due to this arrangement, increased demands are placed on the component accuracy of the discs of the two disc packs; in particular, the axial thickness of the discs must be within tighter tolerances than is the case with simple disc clutches with only one disc pack.

SUMMARY OF THE INVENTION

It was the object of the present invention to improve the efficiency of the production of friction discs for radial dual clutched and thus the production of dual clutches.

In the initially mentioned method, this object is achieved in that the second disc ring is arranged within the first disc ring, and that the second and the first disc rings are processed in the tool together.

Furthermore, the object of the invention is achieved by the initially mentioned friction disc arrangement in which the first axial ring thickness of the first friction disc ring deviates from the second axial ring thickness of the second friction disc ring by a maximum of 0.05 mm, in particular by a maximum of 0.04 mm.

Moreover, the object of the invention is achieved by the initially mentioned dual clutch in which the outer disc pack and the inner disc pack are formed of friction disc arrangements according to the invention, which are produced according to the method according to the invention.

The advantage of this is that by the simultaneous processing and/or production of outer and inner discs, the production time of the friction assembly can be reduced significantly. Moreover, hence, a better use of the tools can be achieved. By the simultaneous processing and/or production of outer and inner discs, moreover, the geometric accuracy of the two discs may be better coordinated and/or the tolerance may be reduced.

For further improving these effects, according to an embodiment variant of the invention, it may be provided that the first and the second disc ring are produced from a carrier ring, onto which friction linings are applied on one or both sides, wherein the connection of the friction linings to the carrier ring for the first and the second disc ring and/or hardening of the friction linings in the tool are carried out together.

According to a further embodiment variant of the invention, a press is preferably used as the tool, since, hence, the method steps listed above of the common production of outer and inner discs can be carried out more easily.

According to an embodiment variant in this regard, it can be provided that the friction linings are also compacted in the press in order to improve component accuracy, among other things.

Preferably, the first and/or the second disc ring is provided with grooves in the tool, whereby the production depth of the production of the friction discs can be further increased by the tool. Besides the formation of cooling channels, by this step, the dimensional accuracy of the friction discs may be improved as well.

According to another embodiment variant of the invention, it may be provided that the first and the second disc rings are connected to one another before they are inserted into the tool, whereby the common handling of the two disc rings can be facilitated, in particular their positioning in the tool.

In this regard, according to an embodiment variant, it may be provided that the connection of the first to the second disc ring is provided with at least one predetermined breaking point, in order to facilitate the separation after processing and/or to prevent unwanted breakouts in the area of the disc rings.

In this regard, it is advantageous if it is provided according to an embodiment variant that the connection is released in the tool, whereby a further reduction of the processing time of the disc rings can be achieved.

For more precise positioning of the disc rings in the tool, however, according to a further embodiment variant of the invention, it can also be provided that a tool is used which has an internal centering device for the second disc ring and an external centering device for the first disc ring.

According to another embodiment variant of the invention, it can be provided that the inner disc ring and the outer disc ring are provided with a marking in the tool. This makes it easier to change the installation positions of the friction discs of a disc pack relative to one another, whereby it becomes easier to compensate for tool inaccuracies, in particular with regard to the flatness of tool surfaces.

An easier assembly of friction discs to a disc pack can also be achieved if, according to further embodiment variants of the invention, it is provided that the first friction disc ring has a tolerance of the first axial ring thickness of a maximum of ±0.02 mm, and/or that the second friction disc ring has a tolerance of the second axial ring thickness of a maximum of ±0.02 mm, and/or that the first friction disc ring and the second friction disc ring has a tolerance flatness according to ISO 1101:2017-09 of a maximum of ±0.02 mm.

According to further embodiment variants of the invention, it may be provided that the first axial ring thicknesses of all first friction disc rings of the outer disc pack deviate from one another by a maximum of 0.05 mm, in particular by a maximum of 0.04 mm, and/or the second axial ring thicknesses of all second friction disc rings of the inner disc pack deviate from one another by a maximum of 0.05 mm, in particular by a maximum of 0.04 mm, and/or that the axial ring thicknesses of all first friction disc rings of the outer disc pack and the axial ring thicknesses of all second friction disc rings of the inner disc pack deviate from one another by a maximum of 0.05 mm, in particular by a maximum of 0.04 mm. In other words, the friction disc packs can be formed of friction discs that are very uniform in terms of their thickness deviation.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 2 shows a cutout from a lining disc in a simplified schematic representation;

FIG. 3 shows an arrangement of an outer and an inner disc on a press carrier in a simplified schematic representation.

DETAILED DESCRIPTION OF PREFERRED EMBODIMENTS

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
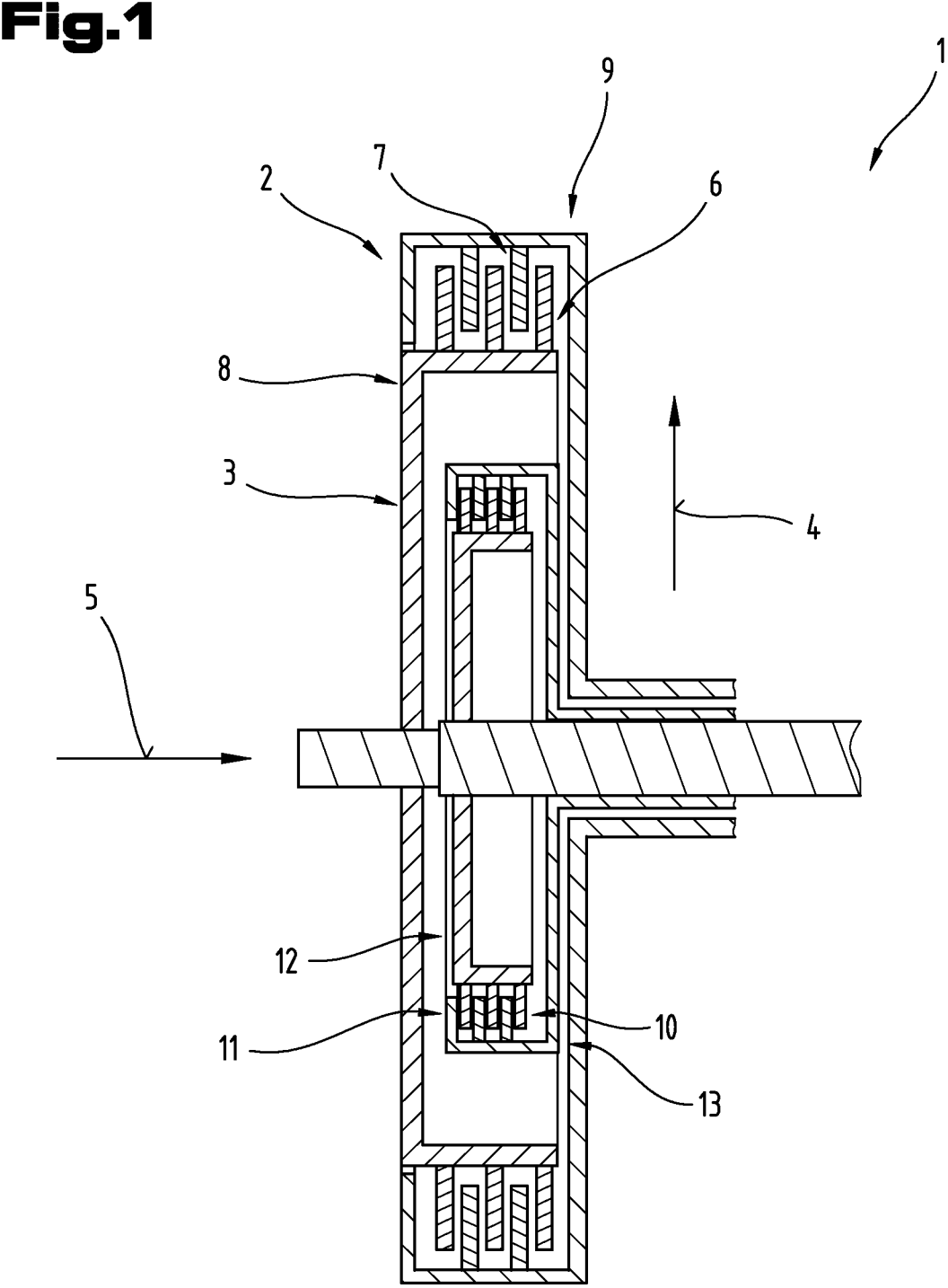
FIG. 1 shows a radial dual clutch in a simplified schematic representation.

FIG. 1 shows a cutout from a radial dual clutch 1, in particular a dual clutch transmission, in a simplified manner. The dual clutch 1 comprises an outer disc pack 2 for the first clutch and an inner disc pack 3 for the second clutch. The inner disc pack 3 is arranged in the radial direction 4 as seen within (below) the outer disc pack 2. Although this is the preferred embodiment variant of the dual clutch 1, since it is space-saving, it is also possible in the context of the invention that the inner disc pack 3 is arranged being offset to the outer disc pack in the axial direction 5.

Preferably, the outer disc pack 2 and the inner disc pack 3 have the same number of friction discs.

The outer disc pack 2 comprises at least one inner disc 6, in particular multiple inner discs 6, and at least one outer disc 7, in particular multiple outer discs 7, which can also be referred to as friction discs. The inner discs 6 are arranged behind one another in the axial direction 5 alternately with the outer discs 7. Via a corresponding actuation mechanism, the inner discs 6 are adjustable relative to the outer discs 7 in the axial direction 5, such that a frictional engagement is established between the inner discs 6 and the outer discs 7.

The number of the inner discs 6 and the outer discs 7 can for example be selected from a range of 1, in particular 2, to 20 in each case. The specific number of inner and outer discs 6, 7 of the outer disc pack 2 shown in FIG. 1 is thus not to be understood as limiting.

The inner discs 6 comprise at least one driver element, for example in the form of an external toothing, on a radially inner end face. Likewise, the outer discs 7 comprise at least one driver element, for example in the form of lugs, on a radially outer end face. Via the driver elements, a torque-proof connection to a further component of the friction assembly, for example a shaft or the housing of the friction assembly can be established, in particular via an inner disc carrier 8 on which the inner discs 6 are arranged, and an outer disc carrier 9 on which the outer discs 7 are arranged, as is per se known.

The inner disc pack 3 comprises at least one inner disc 10, in particular multiple inner discs 10, and at least one outer disc 11, in particular multiple outer discs 11, which can also be referred to as friction discs. The inner discs 10 are arranged behind one another in the axial direction 5 alternately with the outer discs 11. Via a corresponding actuation mechanism, the inner discs 10 are adjustable relative to the outer discs 11 in the axial direction 5, such that a frictional engagement is established between the inner discs 10 and the outer discs 11.

The number of the inner discs 10 and the outer discs 11 can for example be selected from a range of 1, in particular 2, to 20 in each case. The specific number of inner and outer discs 10, 11 of the inner disc pack 3 shown in FIG. 1 is thus not to be understood as limiting.

The inner discs 10 comprise at least one driver element, for example in the form of an external toothing, on a radially inner end face. Likewise, the outer discs 11 comprise at least one driver element, for example in the form of lugs, on a radially outer end face. Via the driver elements, a torque-proof connection to a further component of the friction assembly, for example a shaft or the housing of the friction assembly can be established, in particular via an inner disc carrier 12 on which the inner discs 10 are arranged, and an outer disc carrier 13 on which the outer discs 11 are arranged, as is per se known.

This general structure of a dual clutch 1 is known from the prior art. As regards further details, reference is thus made to the relevant prior art.

The inner discs 6 of the outer disc pack 2 and the inner discs 10 of the inner disc pack 3 can consist of a friction material or, preferably, be embodied as so-called lining discs. The outer discs 7 of the outer disc pack 2 and the outer discs 11 of the inner disc pack 3 can, in this case, be embodied as so-called counter discs.

However, the reverse arrangement is also possible, i.e. that the inner discs 6 of the outer disc pack 2 and inner discs 10 of the inner disc pack 3 are embodied as counter discs, and that the outer discs 7 of the outer disc pack 2 and the outer discs 11 of the inner disc pack 3 consist of a friction material or, preferably, are embodied as lining discs.

Counter discs are friction discs which do not have friction linings and consist of merely one metal, in particular of steel.

Lining discs are friction discs which have at least one friction lining 16 on one side or both sides on a carrier body, in particular a carrier ring 15, as can be seen from FIG. 2.

The friction lining 16 can be embodied entirely in one piece. However, it is also possible that the friction lining 16 is embodied being segmented, i.e. consisting of multiple segments, which are arranged next to one another in the circumferential direction and, in particular, spaced apart from one another on the carrier body. Preferably, the friction linings 16 of one friction disc are embodied alike. However, it also possible that different friction linings 16 are arranged on one friction disc.

The, in particular annular, friction lining 16 is arranged along a radially outer circumference. The friction lining 16 can be arranged so as to directly adjoin the radial outer circumference, i.e. a lateral surface 17 of the carrier body, as can be seen in FIG. 2, or be spaced apart therefrom, i.e. offset radially inwards.

The connection of the friction lining 16 to the carrier body is usually established by bonding, in particular by means of a resin.

The carrier body in particular consists of a metal material, preferably of a steel.

The friction lining 16 is, in particular, formed by a fiber-reinforced resin (e.g. a phenol resin), for example by a resin-soaked paper. Optionally, the friction lining 16 may also comprise friction particles, such as corundum particles etc., in the hard matrix and/or scattered thereon. Such friction linings 16 are known from the prior art to which reference is made in this context to avoid repetitions.

The friction lining 16 may also be a mass-pressed dry-running friction lining. For this purpose, a mixture can be produced from the components of friction lining 16, which is then pressed into a pellet in a press, optionally in a hot press at an elevated temperature (e.g. at a temperature between 100° C. and 190° C.).

If friction discs consist of a friction material, it can consist of the materials known and/or mentioned for friction linings 16.

All lining discs arranged in the dual clutch 1 and/or lining discs consisting of a friction material can be embodied alike at least in terms of the material and/or composite material they consist of. Likewise, all counter discs of the dual clutch can be embodied alike at least in terms of the material they consist of. If the lining discs are provided with linings on both sides, it is possible that the friction linings 16 of one of the end faces are embodied differently than the friction linings 16 of the second end face. In particular, this can relate to the exact formation of a grooving of the friction linings 16 elucidated in further detail below.

Now, below, reference will be made merely to a friction disc arrangement 18 as can be seen as an embodiment variant in FIG. 3. However, the statements below can also be applied to all further friction disc arrangements 18 of the dual clutch 1 (and/or in more general terms the friction assembly). This means that all inner discs 6 of the outer disc pack 2 and all inner discs 10 of the inner disc pack 3 (in each case an inner disc 6 of the outer disc pack 2 together with an inner disc 10 of the inner disc pack 3) or that all outer discs 7 of the outer disc pack 2 and all outer discs 11 of the inner disc pack 3 (in each case an outer disc 7 of the outer disc pack 2 together with an outer disc 11 of the inner disc pack 3) are produced alike.

In this regard, it is also possible that all inner discs 6 of the outer disc pack 2 and all outer discs 11 of the inner disc pack 3 (in each case an inner disc 6 of the outer disc pack 2 together with an outer disc 11 of the inner disc pack 3) or all outer discs 7 of the outer disc pack 2 and all inner discs 10 of the inner disc pack 3 (in each case an outer disc 7 of the outer disc pack 2 together with an inner disc 10 of the inner disc pack 3) are produced alike.

Figure 4:
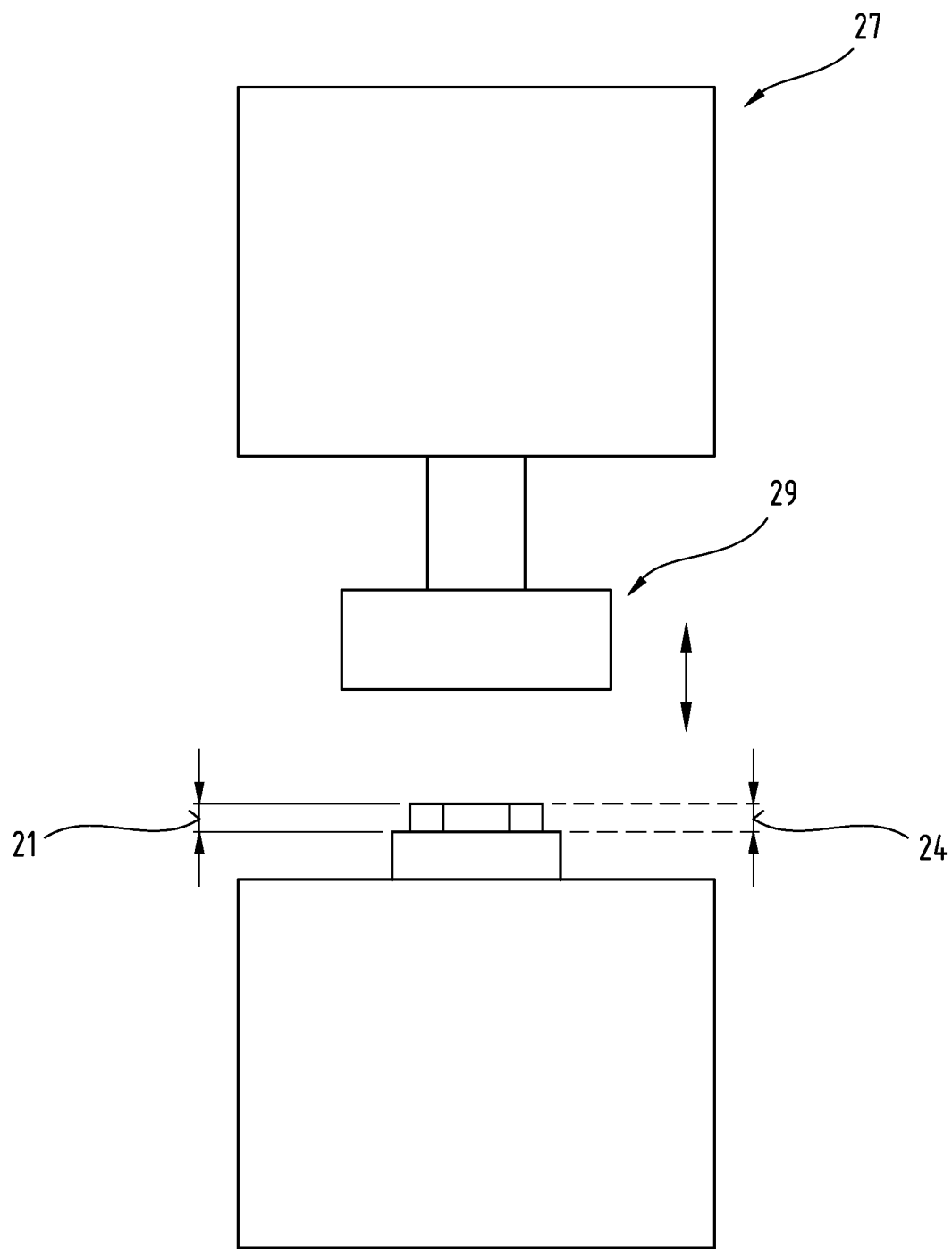
FIG. 4 shows a press in a simplified schematic representation.

A and/or each friction disc arrangement 18 in the context of the invention comprises a first friction disc ring 19 with a first inner diameter 20 and a first axial ring thickness 21 (as can be seen in FIG. 4), a second friction disc ring 22 with a second outer diameter 23 and a second axial ring thickness 24 (as can be seen in FIG. 4). The second outer diameter 23 of the second friction disc ring 22 is smaller than the first inner diameter 20 of the first friction disc ring 19. Hence, it is possible that for the production of the friction disc arrangement 18, the second friction disc ring 22 is arranged within the first friction disc ring 19 (as seen in the radial direction 4).

Thus, the friction disc arrangement 18 consists of a friction disc of the outer disc pack 2 which is formed by the first friction disc ring 19, and a friction disc of the inner disc pack 3 which is formed by the second friction disc ring 22, and/or comprises it. In this regard, the first friction disc ring 19 can form an outer disc 7 or an inner disc 6 of the outer disc pack 2 and the friction disc ring 22 can form an outer disc 11 or an inner disc 10 of the inner disc pack 3. Preferably, in the friction disc arrangement 18, an outer disc 7 of the outer disc pack 2 and an outer disc 11 of the inner disc pack 3 or an inner disc 6 of the outer disc pack 2 and an inner disc 10 of the inner disc pack 3 are combined with one another. However, mixed variants of outer discs 7, 11 with inner discs 6, 10 are also possible.

By the simultaneous production of a friction disc of the outer disc pack 2 and a friction disc of the inner disc pack 3 and taking into consideration the adaption of a tool 25, in particular of a support surface 26, on which the two friction disc rings 19, 22 rest during production, the first axial ring thickness 21 of the first friction disc ring 19 deviated from the second axial ring thickness 24 of the second friction disc ring 22 by a maximum of 0.05 mm, in particular by a maximum of 0.04 mm. Thus, the two friction disc rings 19, 22 have very small tolerances regarding their target dimensions.

In this regard, it is advantageous if an amplitude of the $1^{st}$ order of the thickness deviation has a value of a maximum of 0.02 mm, in particular of a maximum of 0.015 mm, and optionally an amplitude of the $2^{nd}$ order of the thickness deviation has a value of a maximum of 0.015 mm, in particular of a maximum of 0.01 mm, each evaluated using FFT (Fast Fourier Transformation).

In this regard, according to an embodiment variant, it can also be provided that the first friction disc ring 19 has a tolerance of the first axial ring thickness 21 of a maximum of ±0.02 mm, and/or that the second friction disc ring 22 has a tolerance of the second axial ring thickness 24 of a maximum of ±0.02 mm.

According to a further embodiment variant, it may be provided that the first friction disc ring 19 and the second friction disc ring 22 have a tolerance flatness according to ISO 1101:2017-09 of a maximum of ±0.02 mm. The flatness can be measured using a rotation laser, for example a rotation laser T430 of the company Status Pro Maschinen-messtechnik GmbH.

Thus, depending on the embodiment variant, it is possible in the context of the invention to compensate for tilting of tool components or dished and/or corrugated surfaces of the tool 25 for producing the friction disc arrangement 18, i.e. for a pair of friction discs, and/or to reduce the tolerance of the friction discs caused thereby, whereby, in particular, the friction discs can be better used for a radial dual clutch 1, since differences in the construction length of the outer disc pack 2 from that of the inner disc pack 3, in each case as seen in the axial direction 5 (see FIG. 1), can be reduced without time-consuming post-processing of the individual discs.

Merely for the sake of completeness, it should be noted that the mentioned deviations from the target geometry and/or tilting of tool components or the dished and/or corrugated surface of the tool 25 usually are not visible with the naked eye.

According to further embodiment variants of the invention, it may be provided that the first axial ring thicknesses of all first friction disc rings of the outer disc pack deviate from one another by a maximum of 0.05 mm, in particular by a maximum of 0.04 mm, and/or the second axial ring thicknesses of all second friction disc rings of the inner disc pack deviate from one another by a maximum of 0.05 mm, in particular by a maximum of 0.04 mm, and/or that the axial ring thicknesses of all first friction disc rings of the outer disc pack and the axial ring thicknesses of all second friction disc rings of the inner disc pack deviate from one another by a maximum of 0.05 mm, in particular by a maximum of 0.04 mm. The outer disc pack 2 and/or the inner disc pack 2 can thus be made up of and/or assembled of friction discs which each are in the mentioned range of 0 mm to 0.05 mm in view of their thickness deviation.

To produce the friction disc arrangement 18, and thus friction discs for the, in particular radial, dual clutch 1, first, a first disc ring with a first inner diameter and a second disc ring with a second outer diameter are provided, wherein the second outer diameter is smaller than the first inner diameter. If the dimensions of the disc rings change during production, the first disc ring corresponds to the first friction disc ring 19 and the second disc ring corresponds to the second friction disc ring 22. However, as will be elucidated below, this does not have to be the case, so that the first disc ring and the second disc ring can also be referred to as semi-finished products.

The second disc ring is arranged within the first disc ring in the radial direction 4 in the tool 25, in particular placed on the support surface 26 of the tool 25, and then processed using the tool 25 and/or in the tool 25. Thus, the second disc ring and the first disc ring are processed in and/or using the tool 25 together.

As already mentioned, preferably, lining discs are produced by the method according to the invention. According to an embodiment variant of the method, it can be provided that the first and the second disc ring are each produced from a carrier ring 15, onto which friction linings 16 are applied on one or both sides (see FIG. 2). For this purpose, the friction lining blanks are placed on the associated carrier rings 15. The confectioning of the friction lining blanks is preferably performed before placement on the carrier rings 15.

In further consequence, in the tool 25, which is a press 27 according to a preferred embodiment variant (see FIG. 4), the connection of the friction lining blanks to the respective carrier ring 15 for the first and the second disc ring can be established in the tool 25. A glue and/or another adhesive can be used for this purpose. Alternatively or additionally to this, the resin of the friction linings 16 and/or a preliminary stage thereof can be used for resin-bonded friction linings 16 (i.e. in particular in the aforementioned friction linings 16 with a fiber matrix). Moreover, it is possible alternatively or additionally, that resin-bonded friction linings or friction discs are hardened in the tool 25, i.e. the preliminary stage of the resin is polymerized and/or crosslinked. This can be carried out at an increased temperature and/or an increased pressure. In this regard, the temperature can be determined by the respective resin. For example, the temperature can amount to between 100° C. and 250° C. The pressure can, for example, amount to between 80 N/cm$^2$ and 5000 N/cm$^2$. The processing time in the tool 25 can amount to between 0.3 minutes, in particular 1 minute, and 10 minutes.

As mentioned, preferably, a press 27 is used as the tool 25. In this regard, the term "tool" is to be understood in a broader sense. If the press 27 is understood as a machine, the tool 25 is the support within the narrower sense and optionally the clamping tool is understood for clamping the disc rings.

The use of a press 27 as a tool for producing the friction disc arrangement 18 also entails the advantage that thus, according to a further embodiment variant of the method, a permanent compaction of the friction linings 16 and/or of the friction lining blanks (in particular with simultaneous hardening) can be carried out.

The compaction can be produced equally over the entire friction lining 16 within the tolerances. However, it is also possible to provide for differently compacted areas in the respective friction lining 16 and/or the friction linings 16.

In this regard, according to a further embodiment variant, it can also be provided that the first and/or the second disc ring are provided with grooves 28 by compaction in the tool 25 (see FIG. 3). The grooves 28 in particular serve for cooling the friction discs, in particular if the dual clutch 1 is a wet-running radial dual clutch 1. The grooves 28 serve for guiding the coolant, in particular in case of frictional contact.

It should be noted that the grooves 28 can also be produced without compacting the friction linings 16.

Furthermore, it is possible in the context of the invention to produce friction discs for a dry dual clutch 1. These friction discs are not flown around by a coolant, for example cooling oil.

To form the grooves 28, corresponding projections, which are pressed into the respective friction lining 16 during pressing, in particular in the case of simultaneous hardening of the resin of the friction linings 16, can be provided in the support surface 26 of the tool 25 and/or in an upper stamp 29 of the press 27.

The shape and/or the placement of the grooves 28 can be different and, in particular, depend on the respective application of the dual clutch 1 and/or the friction discs. For example, the grooves can also have a simple linear, for example radial, or bent extension. Other patterns, such as a waffle pattern, can also be produced.

Furthermore, it is possible that the grooves 28 of the first friction disc ring 19 are formed differently to the grooves 28 of the second friction disc ring 22. The difference can relate to the geometry, such as depth, width, shape of the cross-section and/or to their extension and/or their arrangement on the friction disc ring 19 or 22.

The first and the second friction disc rings 19, 22 can be inserted into the tool 25 and/or placed on the support surface 26 independently of one another. In this case, it is advantageous if the tool 25 comprises an internal centering device 30 and/or internal clamping device for the second disc ring and an external centering device 31 and/or external clamping device for the first disc ring.

The internal centering device can, for example, be embodied in the form of a centering pin onto which the second disc ring is fitted. The outer diameter of the mandrel is accordingly adapted to the inner diameter of the second disc ring, such that the first disc ring can rest against the mandrel.

The external centering device 31 can be formed by multiple support elements (three finger-like contact elements are shown in FIG. 3, wherein this number is not limiting) which extend radially inwards and on which the first disc ring can be brought into contact with its lateral surface. The contact elements are preferably arranged on the tool 25 being uniformly distributed across the circumference of the first disc ring.

However, according to another embodiment variant, it can also be provided that the first and the second disc ring are connected to one another before they are inserted into the tool 25. Thereby, one of the two disc rings centers the respective other disc ring, such that the tool 25 can be provided with just one centering device, such as the centering pin.

The connection between the two disc ring can, for example, be established via two or more than two connecting webs 32. The connecting webs 32 can be connected to the inner lateral surface of the first disc ring and the outer lateral surface of the second disc ring, in particular integrally formed onto these. However, the connection between the two disc rings can also be embodied differently.

According to an embodiment variant in this regard, it may be provided that the connection of the first to the second disc ring is provided with at least one predetermined breaking point 33. The predetermined breaking point 33 can, for example, be formed as a gouge or notch, etc.

Instead of or in addition to this, according to a further embodiment variant, it can be provided that the connection is released in the tool 25. For this purpose, the tool 25 can, for example, be provided with a cutting device, for example with a knife, which cuts the connection, e.g. the connecting webs 32, directly next to the lateral surfaces of the disc rings.

According to a further embodiment variant, it can be provided that the first friction disc ring 19 and the second friction disc ring 22 are provided with a marking 34 in the tool 25. The marking 34 can, for example, be a dot, a dash, a notch, etc. By the marking 34, it becomes possible to arrange the first and second friction disc rings 19, 22 rotationally offset in the outer disc pack 2 and/or the inner disc pack 3. This means that the first friction disc rings 19 in the outer disc pack 2 are arranged rotated by a predefinable angle value, for example by a value between 5° and 45°, such that the markings 34 are not aligned with each other in the axial direction 5. The same applies to the second friction disc ring 22 and the inner disc pack 3.

By this embodiment variant, it becomes possible to better compensate for tool-caused tolerances of the flatness and the thickness of the friction discs in the finished disc pack, since these deviations from the target value always occur on the same positions of the friction discs and are thus compensated for by mutual rotation of the friction discs.

According to a further embodiment variant of the invention, it can also be provided that a tool 25, in particular a press 27, is used which comprise(s) multiple cavities for the simultaneous production of multiple first friction disc rings 19 and multiple second friction disc rings 22. In this case, the marking 34 can also be used for cavity traceability. The markings 34 of the cavities can differ from one another for this purpose. However, the marking 34 can also be evaluated in the context of the location of the deviation of the axial thickness of the friction disc rings 19, 22. In this case, the marking 34 can also be embodied equally for all cavities.

At this point, it should be noted that the radial distance between the first and the second friction disc ring 19, 22 shown in FIG. 3, just like the radial width of the disc rings 19, 22, is not to be understood as limiting.

The exemplary embodiments show or describe possible embodiment variants of the dual clutch 1 and/or the friction disc arrangement 18, and it should be noted in this respect that the invention is not limited to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. Nevertheless, the description and drawings are to be used for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure of the dual clutch 1 and/or of the friction disc arrangement 18, these are not obligatorily depicted to scale.

Although only a few embodiments of the present invention have been shown and described, it is to be understood that many changes and modifications may be made thereunto without departing from the spirit and scope of the invention.

LIST OF REFERENCE NUMBERS

1 Dual clutch 22 Friction disc ring
2 Outer disc pack 23 Outer diameter
3 Inner disc pack 24 Ring thickness
4 Radial direction 25 Tool
5 Axial direction 26 Support surface
6 Inner disc 27 Press
7 Outer disc 28 Groove
8 Inner disc carrier 29 Upper stamp
9 Outer disc carrier 30 Internal centering device
10 Inner disc 31 External centering device
11 Outer disc 32 Connecting web
12 Inner disc carrier 33 Predetermined breaking point
13 Outer disc carrier 34 Marking
14
15 Carrier ring
16 Friction lining
17 Lateral surface
18 Friction disc arrangement
19 Friction disc ring
20 Inner diameter
21 Ring thickness

What is claimed is:

1. A method for producing friction discs for a dual clutch, comprising the following steps:
providing a first disc ring with a first inner diameter;
providing a second disc ring with a second outer diameter, wherein the second outer diameter is smaller than the first inner diameter; and
processing the first disc ring and the second disc ring in a tool for producing the friction discs;
wherein the second disc ring is arranged within the first disc ring;

wherein the second and the first disc rings are processed in the tool together to form a friction disc arrangement comprising a first friction disc ring corresponding to the first disc ring and having a first axial ring thickness and a second friction disc ring corresponding to the second disc ring and having a second axial ring thickness; and
wherein:
(a) the first friction disc ring has a tolerance of the first axial ring thickness of a maximum of ±0.02 mm and/or the second friction disc ring has a tolerance of the second axial ring thickness of a maximum of ±0.02 mm; or
(b) the first friction disc ring and the second friction disc ring have a tolerance flatness according to ISO 1101: 2017-09 of a maximum of ±0.02 mm.

2. The method according to claim 1,
wherein the first disc ring and the second disc ring are each produced from a carrier ring, onto which friction linings or friction lining blanks are applied on one or both sides; and
wherein the connection of the friction linings or friction lining blanks to the carrier ring for the first and the second disc ring in the tool and/or hardening of the friction linings are carried out together.

3. The method according to claim 2, wherein a press is used as the tool.

4. The method according to claim 3, wherein the friction linings are also compacted in the press.

5. The method according to claim 1, wherein at least one of the first disc ring in the tool and the second disc ring in the tool is provided with grooves.

6. The method according to claim 1, wherein the first disc ring and the second disc ring are connected to one another before the first disc ring and the second disc ring are inserted into the tool.

7. The method according to claim 6, wherein the connection of the first disc ring to the second disc ring is provided with at least one predetermined breaking point.

8. The method according to claim 6, wherein the connection is released in the tool.

9. The method according to claim 1, wherein the tool has an internal centering device for the second disc ring and an external centering device for the first disc ring.

10. The method according to claim 1, wherein the first disc ring in the tool and the second disc ring in the tool are provided with a marking.

11. A friction disc arrangement comprising:
a first friction disc ring with a first inner diameter and a first axial ring thickness; and
a second friction disc ring with a second outer diameter and a second axial ring thickness;
wherein the second outer diameter is smaller than the first inner diameter;
wherein the second friction disc ring can be arranged within the first friction disc ring;
wherein the first axial ring thickness of the first friction disc ring deviates from the second axial ring thickness of the second friction disc ring by a maximum of 0.05 mm; and
wherein:
(a) the first friction disc ring has a tolerance of the first axial ring thickness of a maximum of ±0.02 mm and/or the second friction disc ring has a tolerance of the second axial ring thickness of a maximum of ±0.02 mm; or
(b) the first friction disc ring and the second friction disc ring have a tolerance flatness according to ISO 1101: 2017-09 of a maximum of ±0.02 mm.

12. A dual clutch, comprising:
an outer disc pack (2); and
an inner disc pack;
wherein the outer disc pack and the inner disc pack are formed of friction disc arrangements according to claim 11.

13. The dual clutch according to claim 12, wherein the first axial ring thicknesses of all first friction disc rings of the outer disc pack deviate from one another by a maximum of 0.05 mm and/or the second axial ring thicknesses of all second friction disc rings of the inner disc pack deviate from one another by a maximum of 0.05 mm.

14. The dual clutch according to claim 12, wherein the axial ring thicknesses of all first friction disc rings of the outer disc pack and the axial ring thicknesses of all second friction disc rings of the inner disc pack deviate from one another by a maximum of 0.05 mm.

\* \* \* \* \*